(12) United States Patent
Baxter

(10) Patent No.: US 11,305,827 B2
(45) Date of Patent: Apr. 19, 2022

(54) TRAILER FAIRING WITH LEADING EDGE DESIGN FOR TRAILER CORRUGATIONS

(71) Applicant: Compagnie Generale des Etablissements Michelin, Clermont-Ferrand (FR)

(72) Inventor: Parker Baxter, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 106 days.

(21) Appl. No.: 16/980,550

(22) PCT Filed: Apr. 13, 2018

(86) PCT No.: PCT/US2018/027542
§ 371 (c)(1),
(2) Date: Sep. 14, 2020

(87) PCT Pub. No.: WO2019/199323
PCT Pub. Date: Oct. 17, 2019

(65) Prior Publication Data
US 2021/0001929 A1    Jan. 7, 2021

(51) Int. Cl.
*B62D 35/00* (2006.01)
(52) U.S. Cl.
CPC ......... *B62D 35/007* (2013.01); *B62D 35/001* (2013.01)
(58) Field of Classification Search
CPC .... B62D 35/00; B62D 35/001; B62D 35/008; B62D 35/007
See application file for complete search history.

(56) References Cited

U.S. PATENT DOCUMENTS

| 3,960,402 | A | 6/1976 | Keck |
| 8,251,436 | B2 | 8/2012 | Henderson |
| 8,491,036 | B2 | 7/2013 | Henderson |
| 8,672,391 | B1 | 3/2014 | Cobb |
| 8,684,447 | B2 | 4/2014 | Henderson |
| 9,637,184 | B1 | 5/2017 | Bennett |
| 9,708,017 | B1 | 7/2017 | Regan |
| 2005/0048903 | A1* | 3/2005 | McGhie ............... B65D 88/741 454/118 |
| 2009/0236872 | A1 | 3/2009 | Wood |

(Continued)

FOREIGN PATENT DOCUMENTS

| DE | 102012010002 A1 | 11/2013 |
| KR | 950014419 B1 * | 11/1995 |

OTHER PUBLICATIONS

European Patent Office; International Search Report and Written Opinion for patent application PCT/US2018/027542; filed Apr. 13, 2018, Publisher: European Patent Office, Rijswijk, Netherlands, Dec. 12, 2018, pp. 1-10, enclosed.

*Primary Examiner* — Lori L Lyjak
(74) *Attorney, Agent, or Firm* — Neal P. Pierotti

(57) ABSTRACT

An fairing for a trailer is provided that has a transition zone with a corrugation receiving feature that defines a corrugation receiving void that increases in size forward to rearward in a longitudinal direction of the fairing. The corrugation receiving void receives a corrugation of the trailer. A main portion is also present and extends rearward from the transition zone in the longitudinal direction. The transition zone and the main portion define an aerodynamic surface of the fairing.

16 Claims, 9 Drawing Sheets

(56) References Cited

U.S. PATENT DOCUMENTS

2009/0212594 A1\* 8/2009 Breidenbach ........ B62D 35/007
  296/180.1
2010/0164249 A1 7/2010 Nusbaum
2019/0283813 A1\* 9/2019 Smith .................. B62D 35/007

\* cited by examiner

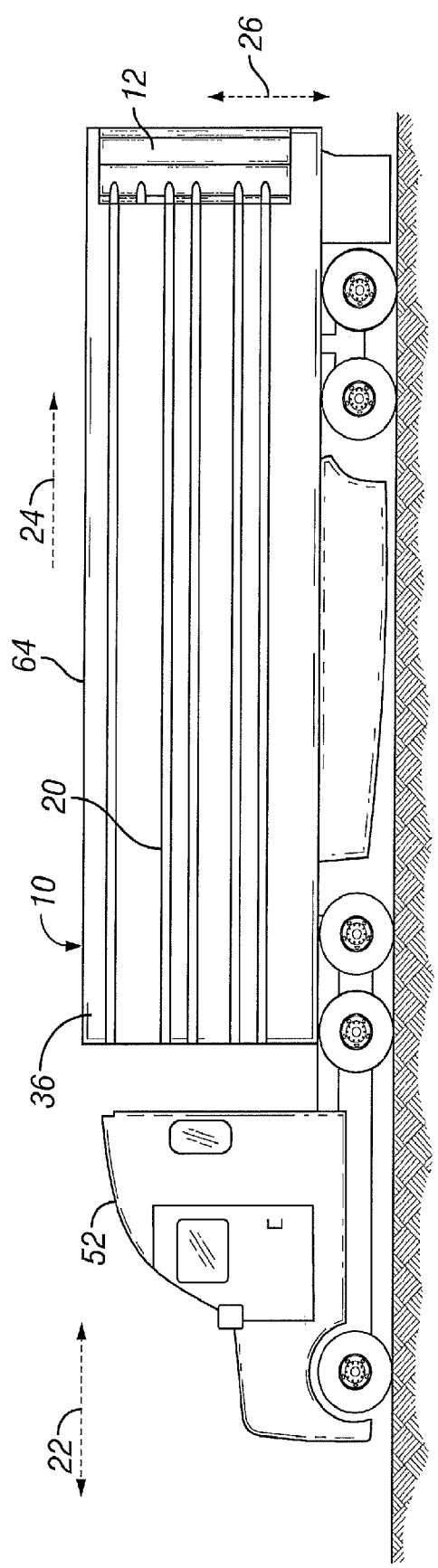
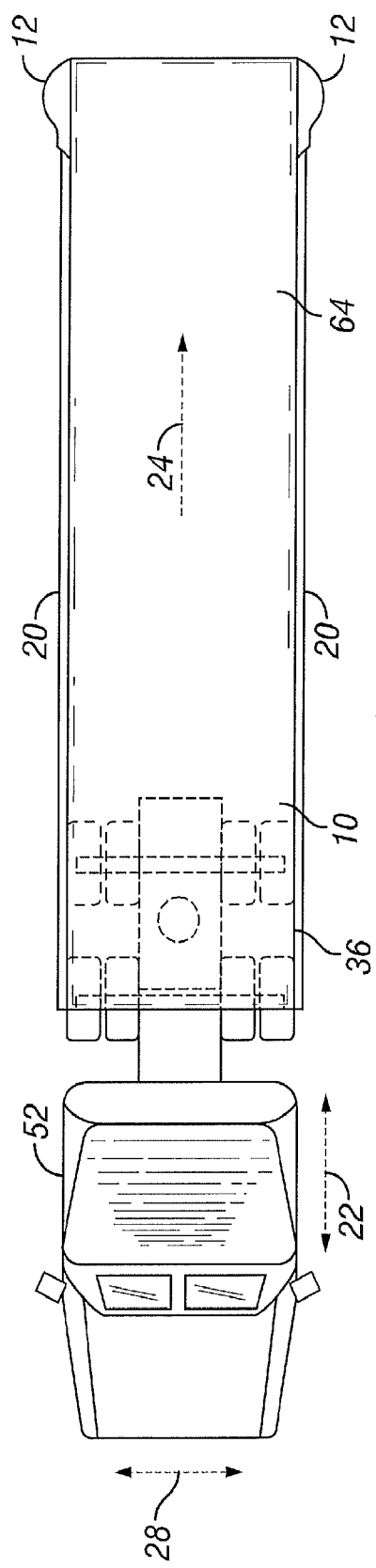
FIG. 1
FIG. 2

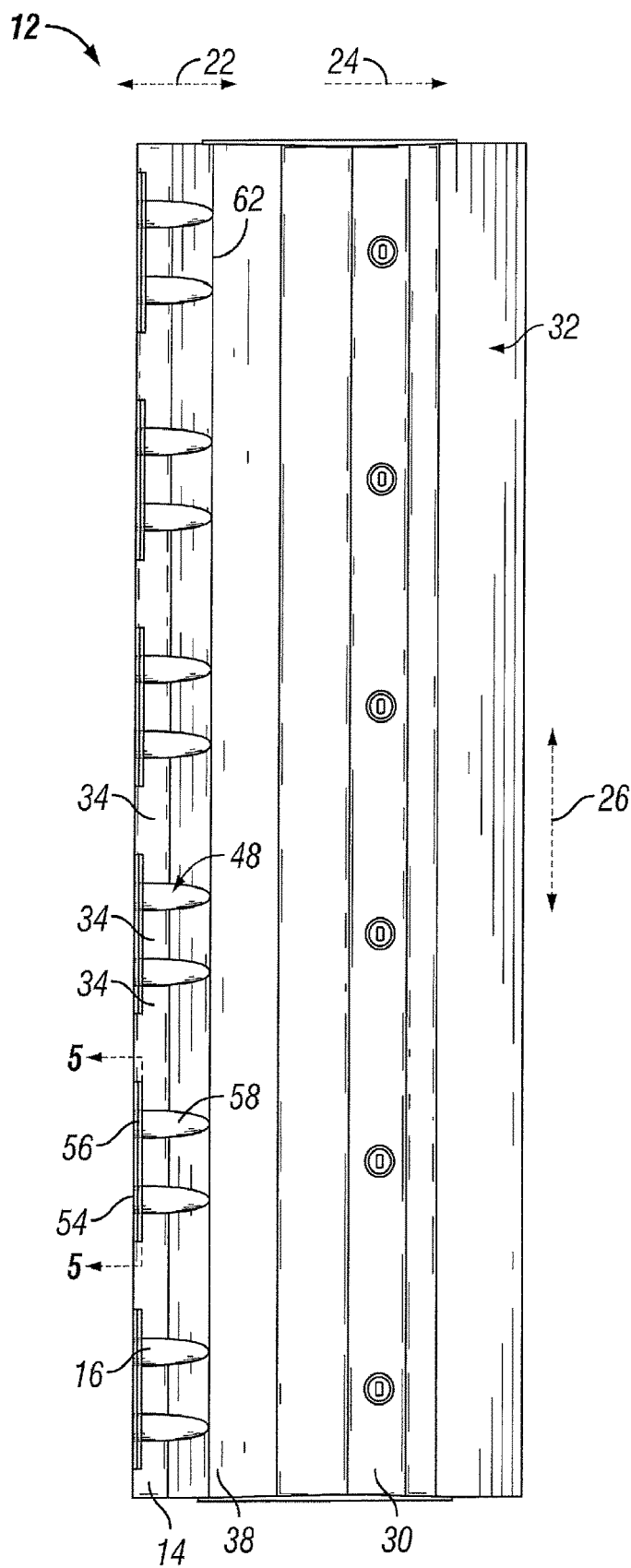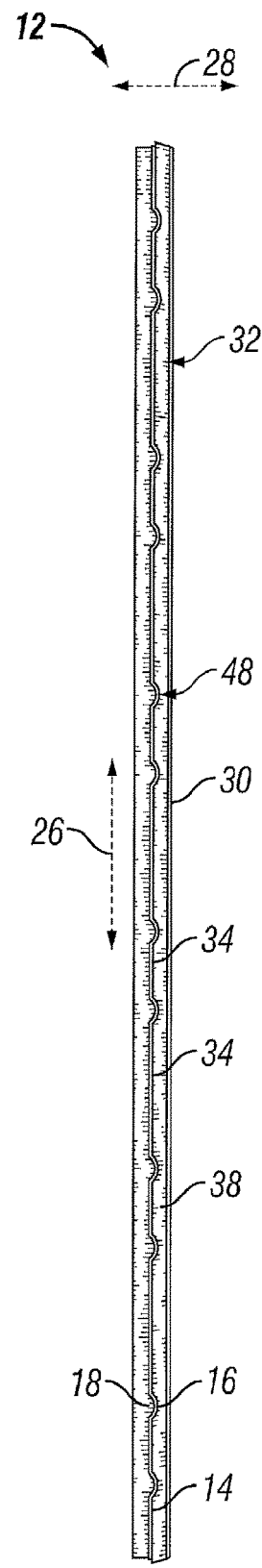
FIG. 4
FIG. 6

TRAILER FAIRING WITH LEADING EDGE DESIGN FOR TRAILER CORRUGATIONS

CROSS-REFERENCE TO RELATED APPLICATIONS

The present application is a 35 U.S.C. § 371 application of PCT/US18/027542 filed on Apr. 13, 2018 and entitled "Trailer Fairing with Leading Edge Design for Trailer Corrugations." PCT/US18/027542 is incorporated by reference herein in its entirety for all purposes.

FIELD OF THE INVENTION

The subject matter of the present invention relates to a fairing for the wall of a trailer of a tractor trailer. More particularly, the present application involves a fairing for a corrugated trailer wall that achieves a close fit to reduce aerodynamic drag and elimination of interruption of the aerodynamic shape.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. For maximum capacity, the trailer is box shaped which is not the most aerodynamically available option. In an effort to improve trailer aerodynamics, trailers have been built, supplemented, or retro-fitted with aerodynamic elements such as side fairings that are on the sides of the trailer at their back ends. These side fairings modify the airflow around or off of the end of the trailer to reduce drag. It is known to produce side fairings that have a curved outer surface that extend from the leading edge of the fairing to its tailing edge to change the airflow about the end of the trailer to reduce dragging force.

Some trailers features side walls that are not flat but are instead corrugated with the corrugations running forward/rearward in the longitudinal direction of the trailer. The use of corrugations, as opposed to a flat side, increases strength and reduces vibrations. Unfortunately, the corrugations define an uneven surface on the side of the trailer which introduces challenges in the application of side fairings thereto. Once such side fairing design employs a corrugated bracket that is attached to the trailer side. A transition piece is attached to a main fairing piece, and this assembly is then attached to the corrugated bracket to complete the side fairing construction. The transition piece has a generic profiled leading edge, and the resulting side fairing is not capable of being closely fit against the side of the trailer. Openings along the edge of the side fairing that are not filled in by the corrugations allow air to flow into the side fairing and inhibit optimal aerodynamic performance. The use of a main fairing piece attached to a secondary transition piece results in an overlap of these components that creates a discontinuity in the upper surface of the assembly. This discontinuity creates an interruption in the aerodynamic shape of the side fairing that also hinders aerodynamic performance. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a tractor hauling a trailer that includes a fairing in accordance with one exemplary embodiment.

FIG. 2 is a top view of FIG. 1.

FIG. 4 is a left side view of the fairing of FIG. 3.

FIG. 6 is a front view of the fairing of FIG. 3.

The use of identical or similar reference numerals in different figures denotes identical or similar features.

DETAILED DESCRIPTION OF THE INVENTION

Figure 3:
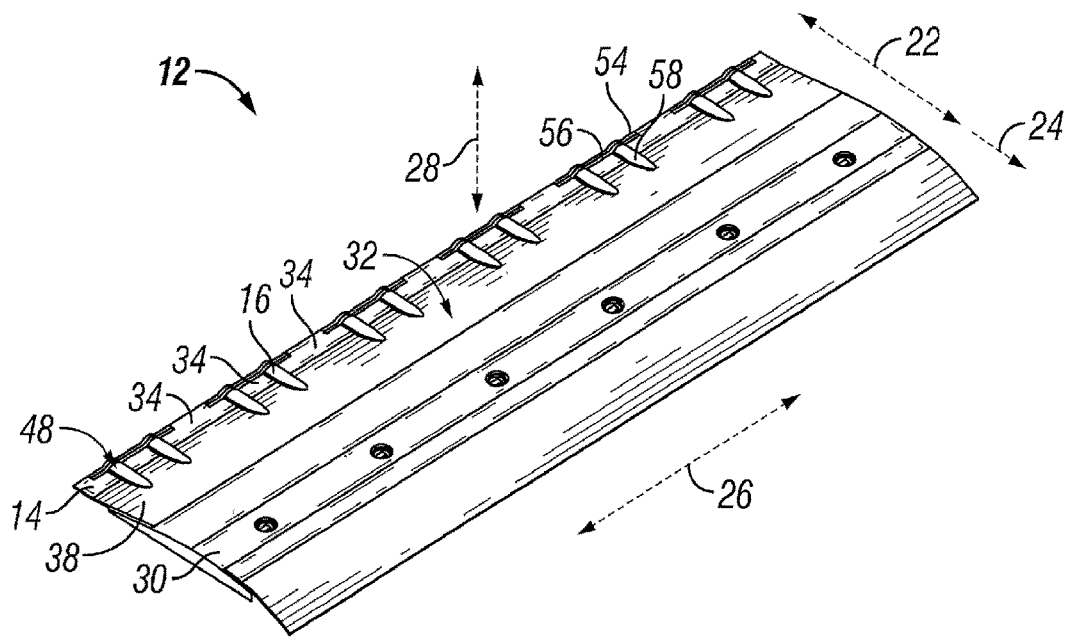
FIG. 3 is a perspective view of a fairing in accordance with another exemplary embodiment.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a fairing 12 attached to the sides 36 and/or top 64 of a trailer 10 hauled by a tractor 52 that enhances aerodynamic properties of the tractor trailer system when driven. The fairing 12 is specifically configured for use with trailers 10 that have sides 36 or tops 64 featuring corrugations 20. The fairing 12 includes one or more corrugation receiving features 16 that have corrugation receiving voids 18 that receive the corrugations 20 and are profiled to achieve a close fit at the leading edge of the fairing 12 to enhance aerodynamic performance Along these lines, the corrugation receiving feature 16 can have different profiles 54, 56, 58, 60 that match different corrugation 20 profiles. Depending upon the size and shape of the corrugation 20 on that particular trailer 10, the fairing 12 can be trimmed so that the counterpart profile 54, 56, 58, 60 of the corrugation receiving feature 16 is present at the leading edge of the fairing 12. Since the profile of the corrugation 20 matches the profile 54, 56, 58, 60 of the corrugation receiving feature 16, an air gap or other discontinuity is not present at this intersection and aerodynamic performance is improved. The corrugation receiving feature 16 can be part of a transition zone 14 at the leading edge of the fairing 12, and a main portion 30 of the fairing 12 may extend rearward from this transition zone 14. The transition zone 14 and the main portion 30 can be made of a single piece, or otherwise constructed, so that a discontinuity such as an attachment location does not exist to interrupt air flow over the fairing 12 as would be present if these parts 14, 30 were separate parts and needed to be attached.

FIGS. 1 and 2 illustrate a tractor 52 that hauls a trailer 10 that includes a series of corrugations 20 on its side 36. The corrugations 20 of trailer 10 are usually shaped and sized the same on any one particular trailer 10. However, the size and/or shape of the corrugations 20 can vary between trailer 10 manufacturers and between trailers 10 of the same manufacturer. It is generally the case that the spacing of the corrugations 20 in the vertical direction 26 remains the same even between different trailer 10 manufacturers. Also, the number of corrugations 20 is usually consistent between trailers 10 of different manufacturers. The corrugations 20 extend outboard in the lateral direction 28 from the flat surface of the side 36 which is disposed between adjacent corrugations 20 in the vertical direction 26. As the corrugations 20 can extend along the entire length of the trailer 10 in the longitudinal direction 22, the fairing 12 will rest on top of them thus causing an air gap to be present between the fairing 12 and the surface of the side 36 if the fairing 12 is not configured for this arrangement. The corrugations 20 are generally arranged in the majority of trailer 10 designs such that a pair of corrugations 20 are located 4 inches apart in the vertical direction 26, and this pair is spaced from another pair by 8 inches in the vertical direction 26. On some trailers 10 the pairing is discontinued at the top such that a single corrugation 20 is at the top instead of a pair of corrugations 20. The corrugations 20 when on the top 64 of the trailer 10 can be spaced from one another in the lateral direction 28 any distance, and like the side corrugations 20 can be provided in any number.

FIGS. 1 and 2 show a trailer 10 that features corrugations 20 on the sides 36 of the trailer 10, but not on the top 64. The fairings 12 that are used may be referred to as side fairings 12 since they are located on the sides 36. The fairing 12 shown in FIG. 1 is located at the rear end of the trailer 10 in the longitudinal direction 22 near the back door which is at the back end of the trailer 10. The fairing 12 may extend to the terminal end of the side 36 in the longitudinal direction 22, or may terminate some amount forward of the terminal end of the side 36 in the longitudinal direction 22. In other embodiments, the fairing 12 extends beyond the terminal end of the side 36 in the longitudinal direction 22 so that it terminates some amount off of the back of the trailer 10, and potentially even rearward of the back doors of the trailer 10 in the longitudinal direction 22. Although the fairing 12 is shown at the back end of the trailer 10, it is to be understood that it may be located at any location along the side 36 in other embodiments, such as at the forward end of the side 36 or at the middle of the side 36 in the longitudinal direction 22. Further, it is to be understood that the trailer 10 has a left side 36 and a right side each having corrugations 20. The right side can be arranged the same as the left side 36, and the fairing 12 on the right side can be arranged in the same manners as the fairing 12 of the left side 36. The present discussion can focus on the side fairing 12 and the left side 36, and a repeat of the drawings and discussion for the right side and its corresponding side fairing 12 need not be repeated for sake of simplicity.

The fairing 12 extends across the majority, but not all of, the height of the side 36 in the vertical direction 26 of the trailer 10. Further, the fairing 12 may extend outboard in the lateral direction 28 more than any portion of the side 36 and the corrugations 20 of the side 36. The fairing 12 can extend to the top of the side 36 in the vertical direction 26, or may stop short so as to be located at least some distance from the top of the trailer 10 in the vertical direction 26. The fairing 12 can include corrugation receiving features 16 that all receive corrugations 20, or as shown in FIG. 1, at least one of the corrugation receiving features 16 may not receive a corrugation 20. Further, in some instances, a frame or bracket may extend along the length of the trailer 10 in the longitudinal direction 22 at the very top of the side 36. In these instances, a section of the fairing 12 at the top can be cut out so that the fairing 12 can fit over this frame/bracket and onto the side 36.

FIGS. 3-8 illustrate a fairing 12 in accordance with one exemplary embodiment. The fairing 12 includes a transition zone 14 that defines a leading edge of the fairing 12 in the longitudinal direction 22. A main portion 30 extends from the transition zone 14 in a rearward direction 24 in the longitudinal direction 22. The outer surfaces of the transition zone 14 and the main portion 30 define an aerodynamic surface 32 of the fairing 12. When the trailer 10 is moving forward, air flowing along the side 36 will encounter the fairing 12 at its leading edge at the transition zone 14 and will flow across the outer surface of the transition zone 14 in the rearward direction 24 and then across the outer surface of the main portion 30 and then off of the fairing 12. This air flow enhances aerodynamic performance of the trailer 10 during normal, forward motion.

The transition zone 14 and the main portion 30 can be configured in a variety of manners in different versions of the fairing 12, and the illustrated configuration in FIGS. 3-8 is but one of many A boundary line 62 is denoted in FIG. 4 and represents the meeting point between the transition zone 14 and the main portion 30. The transition zone 14 includes a plurality of corrugation receiving features 16 that extend across the transition zone 14 in the longitudinal direction 22. The corrugation receiving features 16 terminate at the boundary line 62 in the longitudinal direction 22 and the main portion 30 extends in the rearward direction 24 from this boundary line 62 at the rearward terminal end of the corrugation receiving features 16. The corrugation receiving features 16 may be located exclusively on the transition zone 14, or a portion of the corrugation receiving features 16 may extend and be incorporated into the main portion 30. The boundary line 62 is not a noticeable feature of the fairing 12. The transition zone 14 meets the main portion 30 without any discernable boundary line such that the aerodynamic surface 32 is not interrupted by a transition feature (such as a parting line, overlap, bolts, staples) at this boundary. The air will flow over the exterior surface of the transition zone 14 and then to the main portion 30 without disruption of its profile by any discontinuity on the aerodynamic surface 32. As the aerodynamic surface is smooth at this boundary location, aerodynamic performance will be enhanced on the fairing 12 at this location. The portions of the transition zone 14 and the main portion 30 that form the aerodynamic surface 32 at the boundary line 62 area, or along the entire aerodynamic surface 32, can be a single part and in some instance may be a single molded part.

Figure 8:
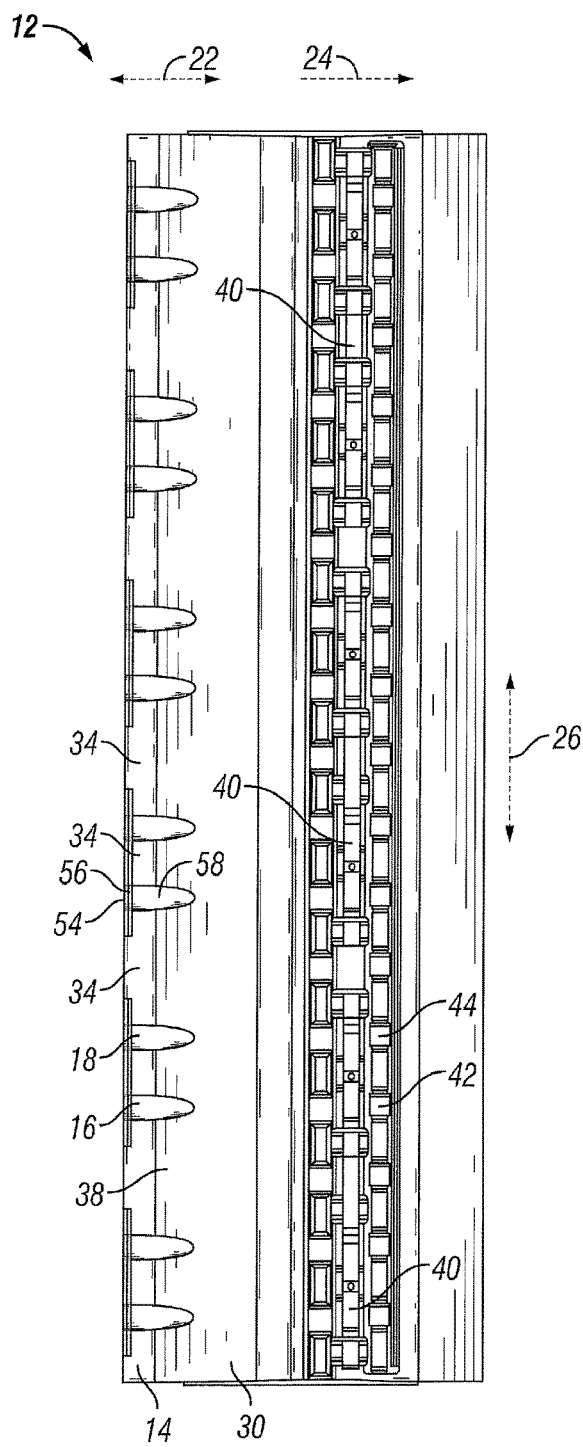
FIG. 8 is a right side view of the fairing of FIG. 3.

With reference to FIG. 8, the fairing 12 may include brackets 40 that are mounted to the side 36 by bolts, adhesion, or other mechanical fasteners. Three brackets 40 are shown and are all identical to one another and are spaced from one another in the vertical direction 26. The brackets 40 are angled to be at different locations in the lateral direction 28 to accommodate passage of the corrugations 20. The fairing 12 also includes a support piece 42 that is attached to the brackets 40. The support piece 42 may be a molded part and may include a series of ribs and other features to increase strength. The support piece likewise has a series of grooves 44 that extend in the longitudinal direction 22 and are spaced from one another in the vertical direction 26 for the purpose of receiving the corrugations 20. The corrugations 20 extend through the grooves 44 so that the support piece 42 can engage the side 36 with a lower surface that extends inboard past the corrugations 20 in the lateral direction 28. The main portion 30 is attached to the support piece 42, and the support piece 42 functions to provide strength to the fairing 12 and help the main portion 30 maintain its shape during use. The support piece 42 is spaced from the transition zone 14 and does not engage the transition zone 14. Six bolt holes are shown extending through the main portion 30, the support piece 42 and the brackets 40 and bolts can be used to attach these components together. The top and bottom of the fairing 12 in the vertical direction 26 can be provided with panels that fully or partially close off the interior of the fairing 12 at these locations. The panels may be part of the main portion 30 and in some instances an extension of the transition zone 14, or may be separate pieces attached to the main portion 30, transition zone 14, and support piece 42. The support piece 42 can be a separate piece from the main portion 30 and transition zone 14, but in other instances the support piece 42 can be integrally formed with the main portion 30 and/or the transition zone 14.

Figure 5:
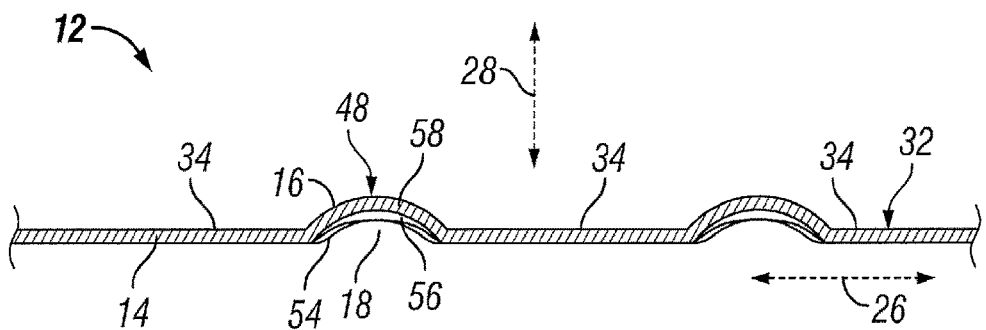
FIG. 5 is cross-sectional view taken along line 5-5 of FIG. 4.
Figure 7:
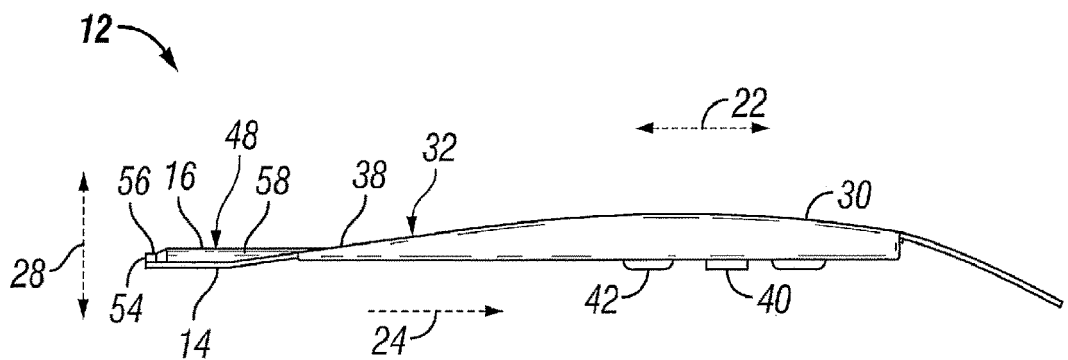
FIG. 7 is a bottom view of the fairing of FIG. 3.

The transition zone 14 includes a plurality of corrugation receiving features 16 disposed along its height in the vertical direction 26. FIG. 4 shows 12 such corrugation receiving features 16 in groups of two disclosed evenly along its height. Each one of the corrugation receiving features 16 have different profile shapes so that they can better fit with the corrugation 20 on that particular trailer 10. The embodiment shown in FIGS. 3-8 includes a first profile 54, a second profile 56, and a third profile 58. In other versions of the fairing 12, any number of profiles can be present. For example, 2, 4, 5, 6, from 7-10, or up to 20 different profiles can be present in the corrugation receiving features 16. FIG. 5 is a cross-sectional view taken along line 5-5 of FIG. 4 that shows two of the corrugation receiving features 16. The first profile 54 has a specific profile shape that would fit a corrugation 20 that has a fairly small amplitude. The second profile 56 matches the center profile of the first profile 54 such that it extends the same amount in the lateral direction 28 but extends vertically higher and lower in the vertical direction 26 than the first profile 54 so as to be bigger. A third profile 58 is present and extends more outboard in the lateral direction 28 than both the first and second profiles 54, 56 and likewise extends higher and lower than the first and second profiles 54, 56 in the vertical direction 26. The profile 54, 56, 58 that corresponds to the profile of the corrugation 20 is selected and is kept on the fairing 12. Any profile forward of the selected profile in the longitudinal direction 22 is removed from the fairing 12 because it would interfere with the engagement between the corrugation 20 and the selected profile. The fairing 12 can then be attached and a matching fit between the corrugation receiving feature 16 and the corrugation 20 is achieved because the corrugation receiving feature 16 is specifically selected and sized to correspond to the corrugation 20 that is present.

The transition zone 14 has a flat section 34 disposed between adjacent corrugation receiving features 16 in the vertical direction 26. This flat section can engage the side 36 when the fairing 12 is attached to the side 36. The corrugation receiving features 16 match the profiles of the corrugations 20 so that a gap does not exist between the side 36 and the fairing 12 along the entire height of the fairing 12 in the vertical direction 26 at the leading edge of the fairing 12. This resulting close fit and absence of a gap results in improved aerodynamic performance of the fairing 12. The flat section 34 is at the leading terminal end of the fairing 12 in the longitudinal direction 22 and extends across the entire height of the fairing 12 in the vertical direction 26, although interrupted by the corrugation receiving features 16, and exhibits the same profile shape along this extent. The flat section 34 may be located entirely within the transition zone 14 such that no portion of the flat section 34 is in the main portion 30.

Figure 9:
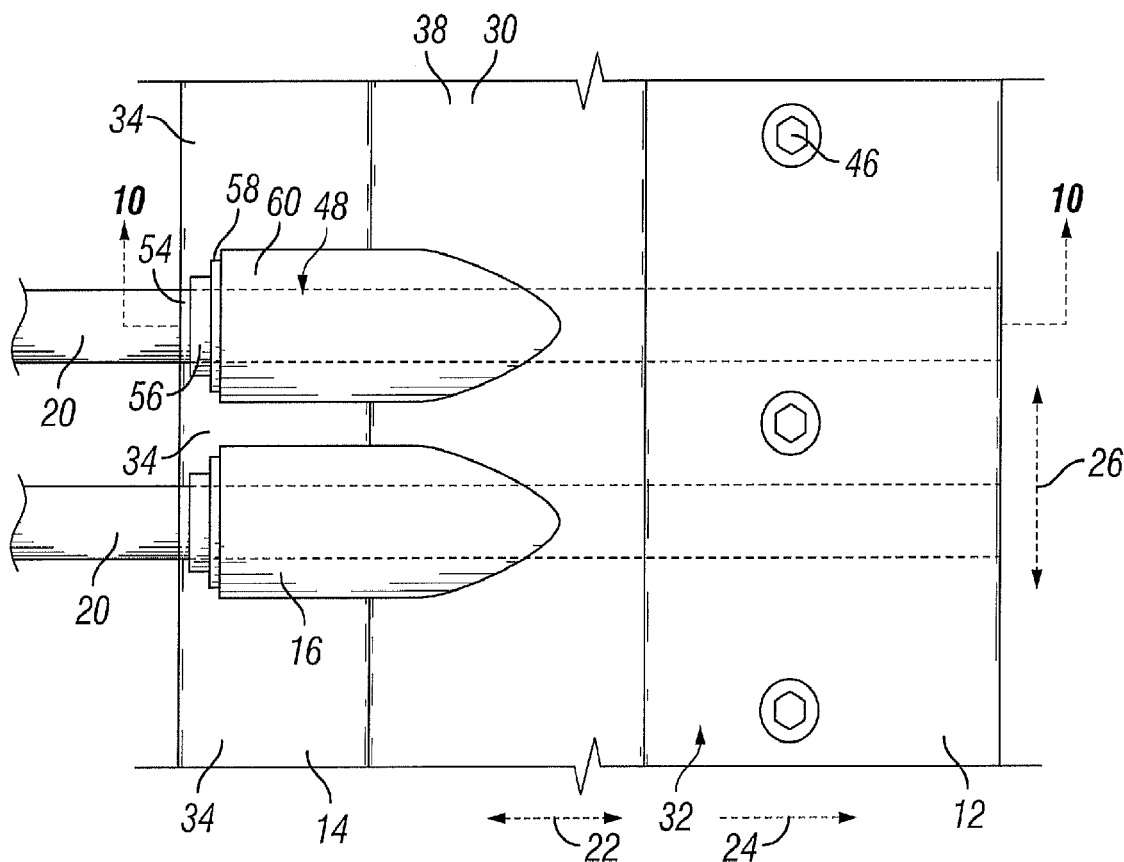
FIG. 9 is left side view of a fairing in accordance with another exemplary embodiment with a pair of corrugations disposed therein.
Figure 10:
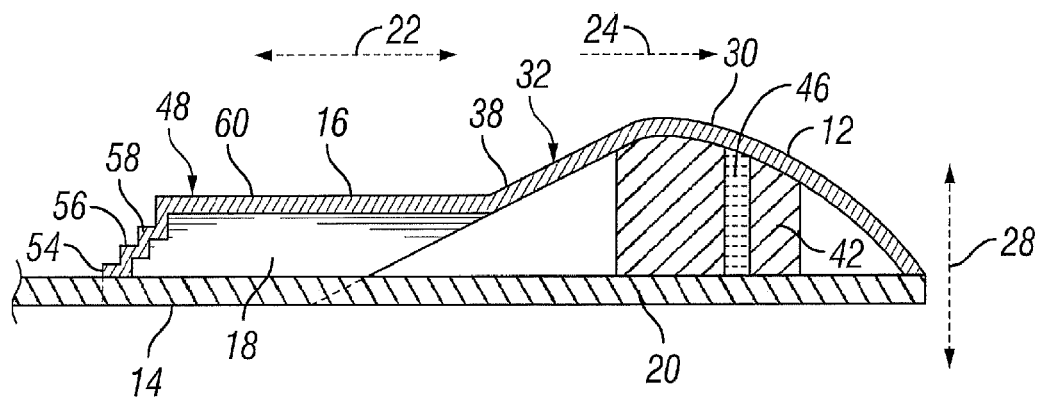
FIG. 10 is a cross-sectional view taken along line 10-10 of FIG. 9.

FIGS. 9 and 10 show another embodiment of the fairing 12 in which two corrugation receiving features 16 are present. It is to be understood that more than two can be present in other embodiments, and that FIGS. 9 and 10 can show just the portions of the fairing 12 that include the corrugation receiving features 16 for purposes of description. Here, the corrugation receiving feature 16 has a first profile 54, a second profile 56, a third profile 58, and a fourth profile 60. The corrugation 20 has a profile that is complimentary to the profile of the first profile 54. As shown in FIG. 10, the fairing 12 rests against the corrugation 20 such that the first profile 54 of the corrugation receiving feature 16 matches and engages the corrugation 20. The second, third and fourth profiles 56, 58, 60 do not match the profile of the corrugation 20 and do not engage the corrugation 20 when the corrugation 20 is disposed within the corrugation receiving feature 16. The corrugation 20 extends in the longitudinal direction 22 past the transition zone 14 and past the support piece 42. The support piece 42 may or may not engage the corrugation 20 in various embodiments. The terminal trailing end of the main portion 30 engages and rests upon the corrugation 20. However, in other versions the main portion 30 may not engage the corrugation 20. Still further, the main portion 30 can extend rearward of the corrugation 20 in the longitudinal direction 22. A bolt 46 is shown disposed through the main portion 30, the support piece 42, and into the bracket 40 (not shown) and tightened in order to draw all three of these components together to cause the fairing 12 to be attached to the side 36, as the bracket 40 is itself bolted or otherwise attached to the side 36. Additional bolts 46 can be disposed within the other illustrated holes to further secure the fairing 12 such that all of the illustrated holes can include a bolt 46 for attachment.

The corrugation receiving feature 16 shown in FIGS. 9 and 10, and those in other embodiments, defines a corrugation receiving void 18 which is a void into which the corrugation 20 is disposed. The corrugation 20 may completely fill the corrugation receiving void 18, or may only partially fill the corrugation receiving void 18 such that some empty space remains in it between the corrugation 20 and the transition zone 14. The corrugation receiving void 18 is arranged so as to expand in size as the profiles transition in the rearward direction 24. This size expansion may be only in the lateral direction 28, only in the vertical direction 26, or may be in both the lateral and vertical directions 28, 26. The size increase is from one profile to the next in the rearward direction 24 and can vary in vertical/lateral 26, 28 directions between adjacent profiles. The size must increase in at least one direction because if it did not, the corrugation 20 would not be able to fit through the forwardly disposed profile, and the fairing 12 would not rest cleanly on the side 36 thus causing a disturbance to the aerodynamic profile of the device.

The fairing 12 can be produced so that it is made to fit a variety of trailer 10 corrugation 20 sizes. The fairing 12 in FIGS. 9 and 10 includes four profiles 54, 56, 58, 60 so that it can be used with four differently configured corrugations 20. A manufacturer can mold the fairing 12 so that the transition zone 14 and the main portion 30 are molded together as a single piece and so that it is designed for a plurality of different corrugation 20 configurations. However, it is to be understood that in reality the fairing 12 will only ever be used for a single corrugation 20 configuration on a single trailer 10. The extra profiles 54, 56, 58, 60 that do not match the corrugation 20 are not used, and only but a single one of the profiles 54, 56, 58, 60 is utilized. Providing the fairing 12 in this manner achieves economies of scale in production of the part, and provides a nimble design that can be tailored for a precise fit of the trailer 10 side 36.

Figure 11:
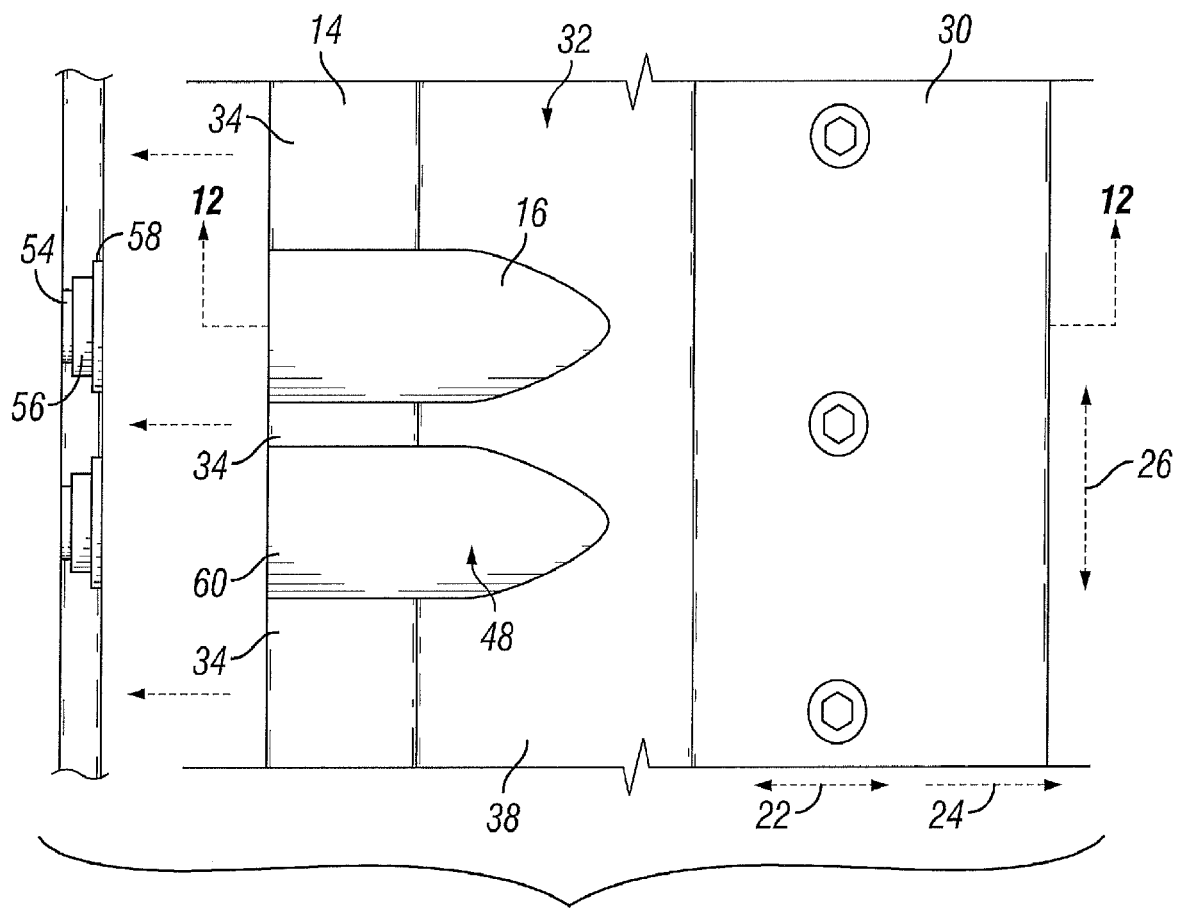
FIG. 11 is a left side view of the fairing of FIG. 9 with the first through third profiles removed.
Figure 12:
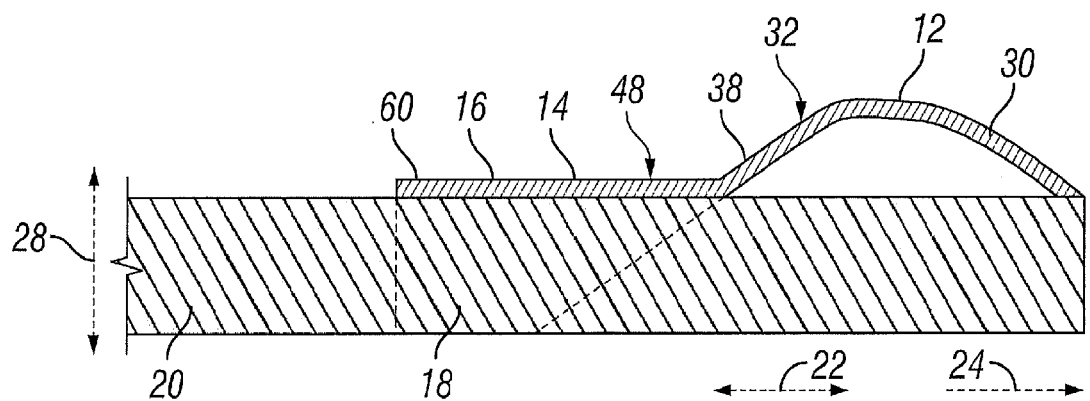
FIG. 12 is a cross-sectional view taken along line 12-12 of FIG. 11.

If the fairing 12 of FIGS. 9 and 10 needs to be placed onto a trailer 10 with corrugations 20 that match the fourth profile 60, instead of the first profile 54 as in FIGS. 9 and 10, the fairing 12 needs to be adjusted. FIGS. 11 and 12 show the fairing 12 of FIGS. 9 and 10 in an adjusted configuration. Here, a cut is made in the vertical direction 26 in the transition zone 14 so that the fourth profile 60 is now at the terminal leading edge of the fairing 12 in the longitudinal direction 22. The section of the transition zone 14 that includes the first, second and third profiles 54, 56, 58 is removed from the rest of the fairing 12 and discarded. The corrugation 20 with the larger profile is not shown in FIG. 11 but is shown in FIG. 12 and it has a shape and size complimentary to that of the fourth profile 60. The corrugation 20 engages the fourth profile 60 and completely fills the corrugation receiving void 18. The corrugation receiving features 16 and their corresponding corrugation receiving voids 18 may all be sized and shaped the same in the fairing 12.

The corrugation receiving feature 16 is at the terminal leading edge of the fairing 12 and extends in the rearward direction 24 across the entire longitudinal length of the flat section 34. The aerodynamic surface 32 may include an intermediate surface 38 that is formed by both the transition zone 14 and the main portion 30. The intermediate surface 38 extends from the flat section 34 in the rearward direction 24. The corrugation receiving feature 16 terminates in the intermediate surface 38 such that its rearward most reach in the longitudinal direction 22 is in the intermediate surface 38 and the intermediate surface 38 continues on from the corrugation receiving feature 16 so as to both extend rearward in the longitudinal direction 22 and outboard in the lateral direction 28 from the corrugation receiving feature 16. The intermediate surface 38 can have a flat exterior with the only exception being the shape of the corrugation receiving feature 16 that is located therein. Alternatively, the intermediate surface 38 can have a convex or concave shaped outer surface. The intermediate surface 38 terminates at the rest of the main portion 30, and this section of the main portion 30 may be one in which the shape of the aerodynamic surface 32 changes from that present in the intermediate surface 38. The intermediate surface 38 could have a flat exterior and terminate at the convex exterior of the main portion 30.

Figure 13:
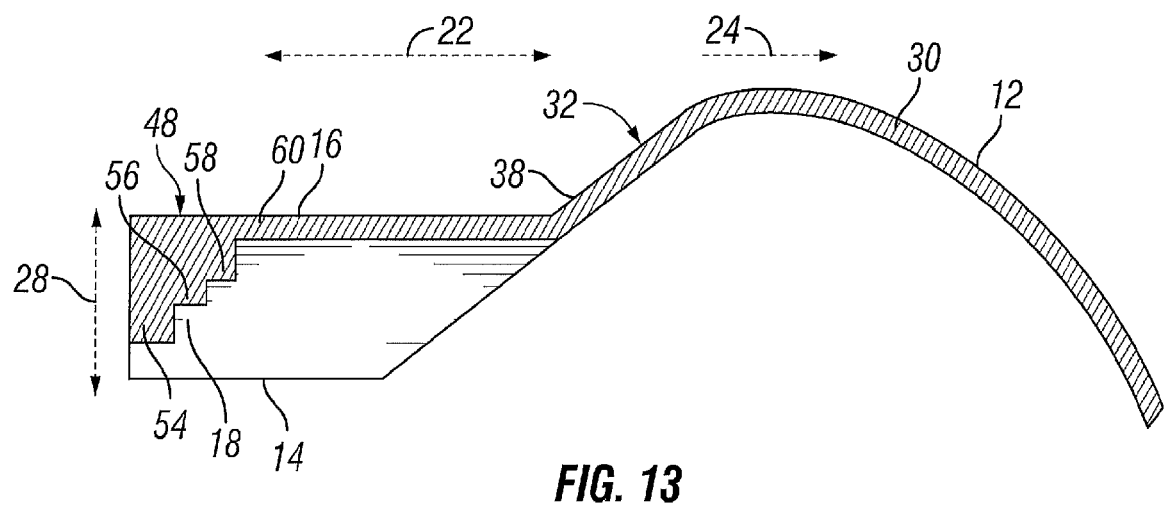
FIG. 13 is a cross-sectional view taken through a corrugation receiving feature of a fairing that has a stepped corrugation receiving void.

FIG. 13 is a cross-section view of another embodiment of the fairing 12 that includes four profiles 54, 56, 58 and 60. However, the exterior surface 48 of the corrugation receiving feature 16 maintains a constant size and shape across all four of these profiles 54, 56, 58, 60. The exterior surface 48 is not stepped and does not otherwise reveal the profile that the corrugation receiving void 18 displays internally. Lines or other indicia can be present on the exterior surface 48 or other portions of the fairing 12 to indicate where the transition zone 14 needs to be cut in order to present the proper profile 54, 56, 58, 60 for engaging the corrugation 20. Although described as cutting, the transition zone 14 can be perforated so that the sections can be removed to access the desired profile 54, 56, 58, 60. Further, the sections of the transition zone 14 can be attached to one another through bolts, clips, hook and loop fasteners, or adhesives in other embodiments. However, it is to be understood that the preferred arrangement of the transition zone 14 is integral formation of the profiles 54, 56, 58, 60 followed by cutting of the transition zone 14 in the vertical direction 26 to render the desired profile shape of the transition zone 14.

Figure 14:
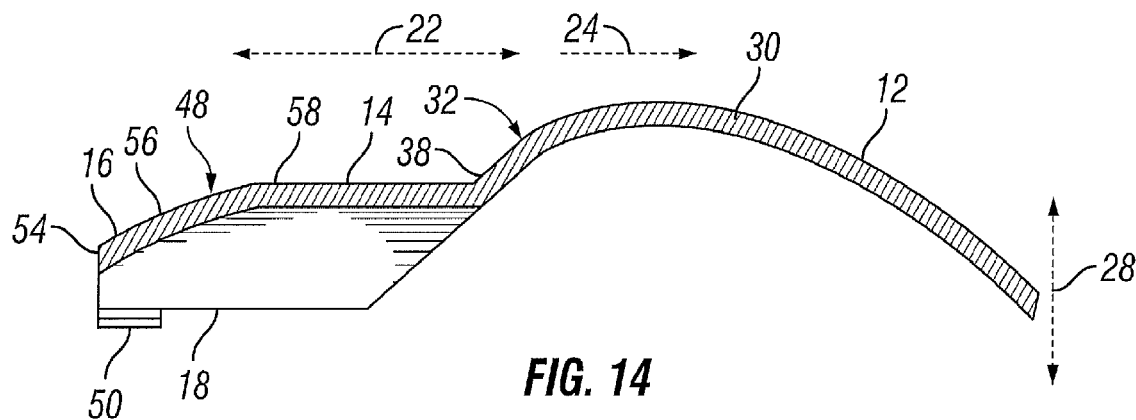
FIG. 14 is a cross-sectional view taken through a corrugation receiving feature of a fairing that has a swept corrugation receiving void.

FIG. 14 is a cross-sectional view of the fairing 12 through a section that includes the corrugation receiving feature 16 in accordance with another exemplary embodiment. A piece of double sided tape 50 is at the bottom of the transition zone 14 and is used for attachment to the side 36. The double sided tape 50 can extend the entire length of the fairing 12 in the vertical direction 26, or may extend only a portion of its vertical 26 length, or may be in several different pieces in several different locations. The double sided tape 50 may be located on one or more of the flat sections 34, but not on any of the corrugation receiving features 16. Alternatively, double sided tape 50 is not used. In some instances, no fasteners are present in the transition zone 14, while in others mechanical fasteners or other attachment mechanisms are used to fix the transition zone 14 against the side 36.

The profiles 54, 56, 58 are not stepped like in other arrangements, but are swept profiles. The profiles 54, 56, 58 blend into one another along a spline. The corrugation receiving void 18 and the exterior surface 48 are both swept. In use, the user can cut the corrugation receiving feature 16 at the appropriate profile 48, 58 or not cut the fairing 12 if the first profile 54 is desired. Other arrangements are possible in which the corrugation receiving feature 16 is both swept and stepped. This combination may be present from one profile 54, 56, 58, 60 to the next such that some, for example the first and second profiles 54 and 56 have a step, while others like the third and fourth profiles 58 and 60 have a swept transition. Also, the profiles 54, 56, 58, 60 can be arranged so that the transition from one to the next has a portion that is stepped and a portion that is swept. The swept profile of the corrugation receiving feature 16 can result in a profile that is not a distinct profile so that one may have to take care in measuring the right size for the counterpart corrugation 20, or some other indicia may be present to tell the user where to trim the fairing 12 to achieve the right profile fit. The use of a swept profile may allow for many profiles to exist in the corrugation receiving feature 16.

Figure 15:
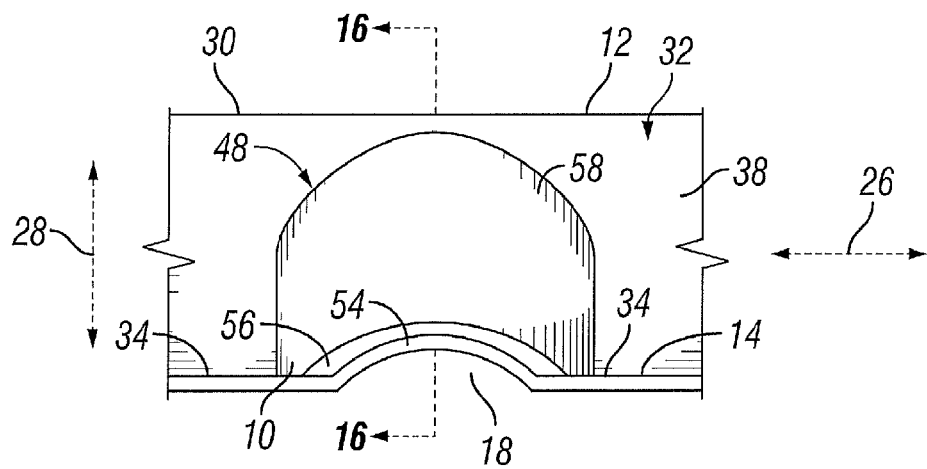
FIG. 15 is a front view of a portion of a fairing in accordance with yet another embodiment in which the profiles of the corrugation receiving feature have different shapes.
Figure 16:
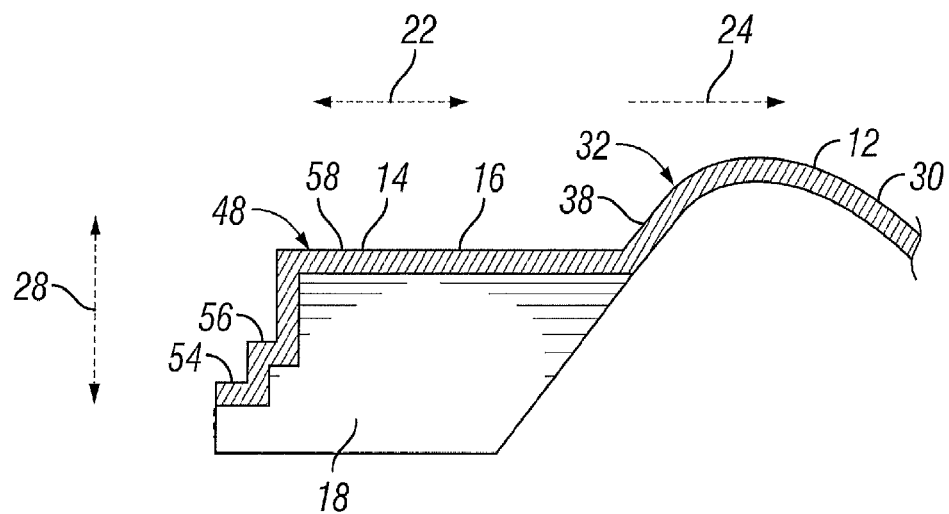
FIG. 16 is a cross-sectional view taken along line 16-16 of FIG. 15.

FIGS. 15 and 16 illustrate another exemplary embodiment in which three profiles 54, 56, 58 are present and in which the size of the profiles 54, 56, 58 at their center in the vertical direction 26 increases in the lateral direction 28 from profile 54, 56, 58 to profile 54, 56, 58 in the rearward direction 24. However, the shapes of the profiles 54, 56, 58 are different in that the first profile 54 is more semi-circular while the second profile 56 is flatter but taller in size in the vertical direction 26. The third profile 58, on the other hand, has straight sides that extend in the lateral direction 28 connected by an arc shaped end. As such, it is to be understood that the shapes of the profiles 54, 56, 58 can be different from one another. The sizes will necessarily have to be different because none of the profiles 54, 56, 58 will have the exact same size at all points, although some of them could for example be of the same size in the lateral direction 28 at their midpoint in the vertical direction 26.

Figure 17:
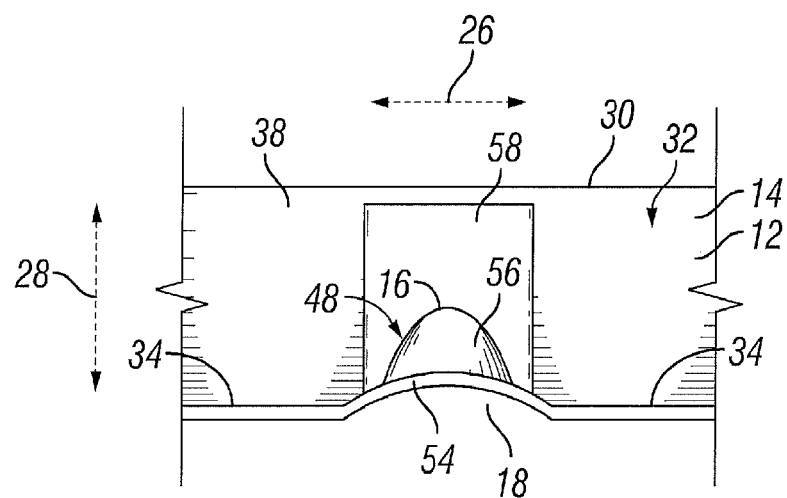
FIG. 17 is a front view of a portion of a fairing in which the profiles of the corrugation receiving feature have different shapes.

FIG. 17 shows another embodiment of the fairing 12 in which three profiles 54, 56, 58 are present and have different sizes and shapes. The first profile 54 which is at the leading edge of the fairing 12 has a size in the vertical direction 26 greater than that of the other two profiles 56, 58, but has a size in the lateral direction 28 at its midpoint that is less than that of the other two 56, 58. If one desires to employ the second profile 48, the first profile 54 of the corrugation receiving feature 16 is removed and the corrugation 20 is fit into the second profile 48. Gaps may be present on either vertical side of the corrugation 20 and the transition zone 14 in the vertical direction 26 due to the second profile 56 having a shorter length in the vertical direction 26 than the first profile 54. If the third profile 58 is selected, the first and second profiles 54, 56 are both removed. The third profile 58 is likewise shorter than the first profile 54 in the vertical direction 26 and gaps can result if the corrugation 20 fills the third profile 54 on either end in the height direction 26 between it and the corrugation receiving feature 16. As such, it is to be understood that certain embodiments of the fairing 12 exist in which the transition zone 14 does not lay flat, flush against the side 36 and its corrugations 20 even when the appropriate profile 54, 56, 58, 60 is selected and engages the corrugations 20.

The close fit of the fairing 12 to the side 36 due to the selectable profiles 54, 56, 58, 60 reduces aerodynamic drag. Further, the absence of a discontinuity or other attachment mechanism/point between the transition zone 14 and the main portion 30, since these can be made of a single piece or of a single molded part, likewise reduces aerodynamic drag. The need for a second part can be eliminated along with the turbulence it generates in disrupting aerodynamic performance due to its attachment configuration. The main portion 30 and transition zone 14 can be manufactured as one molded part that can be used on a wide range of trailers 10 as the desired profile 54, 56, 58, 60 for that particular trailer 10 can be selected by the installer or by one who provides the fairing 12 to the user. The parts of the side fairing 12 can be made up of plastics, lightweight metals, or 3D printed resin. Further, processes such as 3D printing, injection molding, casting, or machining may be used in its construction.

Figure 18:
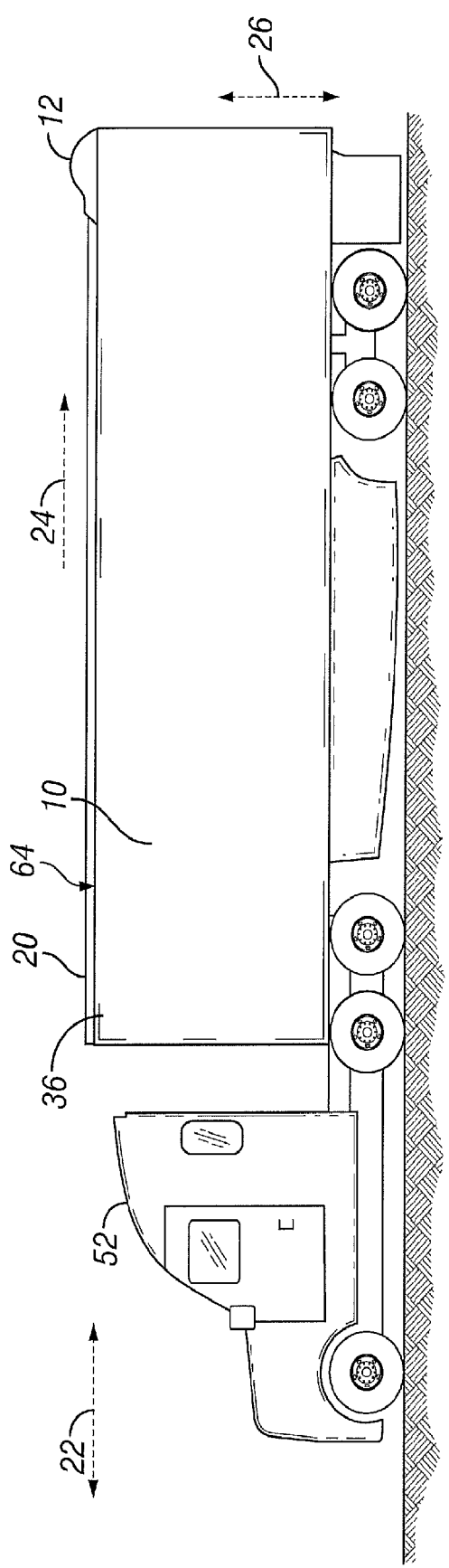
FIG. 18 is a side view of a tractor hauling a trailer with the fairing on the top surface of the trailer.

Although described in use on the side 36 of the trailer 10, the fairings 12 can in addition to or alternatively to being a side fairing 12 may also be a top fairing 12 that is used on the top 64 of the trailer 10. FIG. 18 shows an embodiment in which no side corrugations 20 are present and no side fairings 12 are present. It is to be understood that side fairings not having the corrugation receiving features 16 can be present on sides 36 if the sides 36 do not have corrugations 20. Top corrugations 20 on the top 64 are present, and the fairing 12 that is used may be referred to as a top fairing 12. The flat section 34 can engage the top 64 in the same manner as the flat section 34 engages the side 36 when the fairing 12 is arranged as a side fairing 12. The top fairing 12 can be arranged and constructed in the same manners as previously discussed and a repeat of this information is not necessary.

Figure 19:
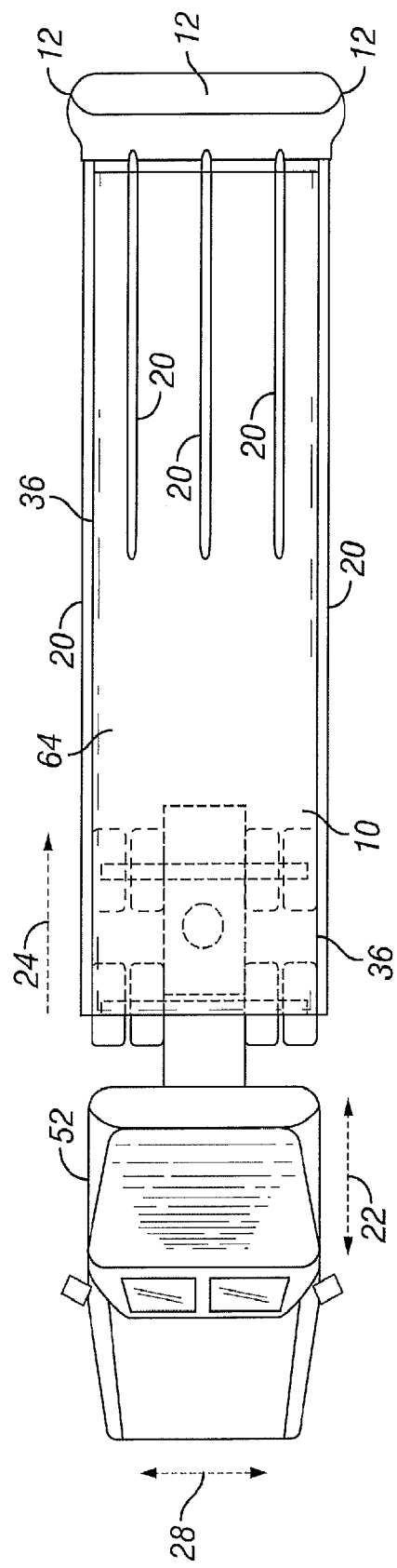
FIG. 19 is a top view of a tractor hauling a trailer with fairings on both the sides and top of the trailer.

FIG. 19 is a top view of the tractor 52 and trailer 10 and includes fairings 12 on both the sides 36 and the top 64. The corrugations 20 on the top 64 extend only a portion of the full length of the trailer 10 in the longitudinal direction 22 but could extend the entire length in other embodiments. The fairing 12 may be a single piece in that it extends over the left side 36 and across the corner formed by the left side 36 and the top 64, and extends across the top 64 to the corner formed by the top 64 and the right side 36 and over the right side 36. This fairing 12 may include the corrugation receiving features 16 as discussed so as to receive corrugations 20 on both sides 36 and also on the top 64. The fairing 12 in other embodiments may extend across the left side 36 some portion or full amount, and may also extend about the corner formed by the left side 36 and the top 64 but not across the entire top 64. In a similar manner, the fairing 12 could be located at the right side 36 and the corner formed at the right side 36 and the top 64 but not across the entire lateral length of the top 64.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A fairing for a trailer, comprising:
    a transition zone, wherein the transition zone has a corrugation receiving feature that defines a corrugation receiving void that increases in size forward to rearward in a longitudinal direction of the fairing, wherein the corrugation receiving void is configured for receiving a corrugation of the trailer; and
    a main portion that extends rearward from the transition zone in the longitudinal direction, wherein the transition zone and the main portion define an aerodynamic surface of the fairing;
    wherein the transition zone and the main portion are located on a side or top of the trailer and both the transition zone and the main portion cover a portion of the side or top of the trailer.

2. The fairing as in claim 1, wherein the corrugation receiving void is differently shaped forward to rearward in the longitudinal direction of the fairing.

3. The fairing as in claim 1, wherein the corrugation receiving void is stepped to result in the increase in size forward to rearward in the longitudinal direction of the fairing.

4. The fairing as in claim 1, wherein the corrugation receiving void is swept to result in a gradual increase in size forward to rearward in the longitudinal direction of the fairing.

5. The fairing as in claim 1, wherein the transition zone and the main portion are integrally formed with one another so as to be a single piece.

6. The fairing as in claim 1, wherein the transition zone has a flat section that extends from the corrugation receiving feature in a vertical direction of the fairing, wherein the flat section is configured for engaging the side or top of the trailer, wherein the corrugation receiving feature is configured for engaging the corrugation of the trailer.

7. The fairing as in claim 6, wherein the aerodynamic surface that extends rearward in the longitudinal direction across the flat section transitions from the transition zone to the main portion without any noticeable feature.

8. The fairing as in claim 6, wherein the transition zone and the main portion both define an intermediate surface that is a portion of the aerodynamic surface, wherein the corrugation receiving feature terminates in the longitudinal direction at the intermediate surface.

9. The fairing as in claim 1, further comprising:
a bracket configured for engagement to the side or top of the trailer;
a support piece that engages the bracket and that engages the main portion, wherein the support piece has a groove that is configured for receiving the corrugation of the trailer; and
a bolt that attaches the main portion and the support piece to the bracket.

10. The fairing as in claim 1, wherein the transition zone is a single, molded piece such that the corrugation receiving feature is a single, molded piece.

11. The fairing as in claim 1, wherein the corrugation receiving feature has an exterior surface that forms part of the aerodynamic surface of the fairing, wherein the exterior surface of the corrugation receiving feature increases in size forward to rearward in the longitudinal direction of the fairing.

12. The fairing as in claim 11, wherein the exterior surface of the corrugation receiving feature is swept to result in a gradual increase in size forward to rearward in the longitudinal direction of the fairing.

13. The fairing as in claim 1, further comprising double sided tape attached to the transition zone, wherein the double sided tape is configured for attachment to the side or top of the trailer.

14. The fairing as in claim 1, wherein the corrugation receiving feature has a first profile and a second profile that is sized differently than the first profile, wherein the second profile is located rearward from the first profile in the longitudinal direction, wherein the corrugation receiving feature has a third profile that is sized differently than the second profile and the first profile, wherein the third profile is located rearward from the second profile in the longitudinal direction.

15. The fairing as set forth in claim 1, wherein the fairing is a side fairing and is configured for attachment to the side of the trailer.

16. A fairing for a trailer, comprising:
a transition zone, wherein the transition zone has a corrugation receiving feature that defines a corrugation receiving void that increases in size forward to rearward in a longitudinal direction of the fairing, wherein the corrugation receiving void is configured for receiving a corrugation of the trailer;
a main portion that extends rearward from the transition zone in the longitudinal direction, wherein the transition zone and the main portion define an aerodynamic surface of the fairing; and
double sided tape attached to the transition zone, wherein the double sided tape is configured for attachment to the side or top of the trailer.

* * * * *